United States Patent [19]

Davis

[11] 4,376,385
[45] Mar. 15, 1983

[54] SLIDE HAMMER HAVING SPOT WELDABLE SURFACE ENGAGING CAPABILITY

[76] Inventor: Michael G. Davis, 2902 White Ave., Baltimore, Md. 21214

[21] Appl. No.: 190,633

[22] Filed: Sep. 24, 1980

[51] Int. Cl.³ .............................................. B21D 1/12
[52] U.S. Cl. ...................................... 72/479; 72/705; 7/100
[58] Field of Search ................ 72/479, 705, 458, 342, 72/379; 219/98, 137; 29/402.07, 402.19, 402.05, 402.01; 7/100

[56] References Cited

U.S. PATENT DOCUMENTS

| | | | |
|---|---|---|---|
| 2,605,658 | 8/1952 | Sanchez | 72/705 |
| 3,113,478 | 12/1963 | Hall, Jr. et al. | 72/705 |
| 3,570,289 | 3/1971 | Smyers | 72/705 |
| 3,801,772 | 4/1974 | Curcio | 29/402.19 |
| 3,959,619 | 5/1976 | Schill | 72/705 |
| 4,032,742 | 6/1977 | Kendrick et al. | 219/98 |

FOREIGN PATENT DOCUMENTS

| | | | |
|---|---|---|---|
| 2616743 | 3/1977 | Fed. Rep. of Germany | 72/705 |
| 7500089 | 7/1976 | Netherlands | 72/342 |

Primary Examiner—Lowell A. Larson
Attorney, Agent, or Firm—Lerner, David, Littenberg & Samuel

[57] ABSTRACT

A tool for recontouring metal such as dents in the body of an automobile, for use in conjunction with an electrical welding apparatus, including a shaft on which a weight reciprocates, the weight being permitted to selectively collide with structure provided by the shaft to impart a force to the shaft along the longitudinal axis thereof, a portion of the shaft being electrically conductive and electrically connected to the electrical welding apparatus, the electrically conductive portion of the shaft for contacting the metal surface to be straightened, activation of the electrical welding apparatus welding the electrically conductive portion of the shaft to the surface to be straightened so that the forces transferred to the shaft by the weight can act upon the surface to be straightened. One embodiment of the present invention is configured to cooperate with the electrode provided by commercial electrical welding apparatuses while a second embodiment shows a configuration for wiring the tool directly to a cable which in turn can be connected to various types of welding apparatuses.

12 Claims, 3 Drawing Figures

SLIDE HAMMER HAVING SPOT WELDABLE SURFACE ENGAGING CAPABILITY

BACKGROUND AND/OR ENVIRONMENT OF THE INVENTION

1. Field of the Invention

The present invention relates to tools for straightening or recontouring metal surfaces, and more particularly, to a slide hammer having a spot weldable surface engaging capability.

2. Description of the Contemporary and/or Prior Art

The straightening or recontouring of metal surfaces such as in automobile bodies, when they are dented, is usually accomplished by one of several well known techniques. If possible, the dented surface is impacted on the nonvisible rear side thereof to force the dent outwardly. However, more often than not, this is impractical because of interference from other automobile structure and therefore inaccessibility of the rear side of the dented surface. An alternate method of straightening these bent surfaces is effected by affixing of a tensioning impact tool to the outer surface of the dent and imparting of a tensioning force to the dent to pull the same into the proper configuration.

Devices used in this manner are variously known as slide hammers, slap hammers, impact hammers, etcetera. Such an apparatus is taught in U.S. Pat. No. 2,934,984 issued to Woodman on May 3, 1960. Woodman shows a dent remover which includes a shaft having a tapered threaded portion affixed at one end thereof. The tapered threaded portion is forced through the sheet metal to be straightened or is threaded into a predrilled aperture to affix the end of the tool to the metal. A weight is then shifted on the shaft of the tool to provide the desired pulling effect. Use of this instrument requires the punching or drilling of a hole through the metal to be straightened which later must be filled in and repaired. If the metal which is to be straightened has been flattened against another surface, this tool cannot be employed. An impacting tool which affixes to a metal surface in a similar manner is shown in U.S. Pat. No. 3,519,087 issued to Santi on July 7, 1970.

A variation of this method of engagement is shown in U.S. Pat. No. 3,878,709 issued to Chartier on Apr. 22, 1975. Chartier requires the formation of a hole in the metal surface to be straightened and a hooked element is inserted in the hole engaging the metal so that a pulling force can be imparted thereto. As when the above discussed apparatuses are employed, a hole with the attendant subsequent repair requirement must be employed.

U.S. Pat. No. 3,113,478 issued to Hall, Jr. et al on Dec. 10, 1963 shows a tool for removing auto body dents or the like which is provided with a plurality of chuck engaging footers for engaging the metal surface to be straightened. One configuration of footer is shown to be hook like so as to be inserted in a hole punched through the metal. Another configuration of footer is shown which can be soldered, welded, brazed, or the like to a metal surface. The process of affixing a footer through a separate operation of soldering, welding, brazing, or the like is inconvenient, time consuming, and therefore costly. In addition, the user must manipulate the soldering, welding, or brazing instruments at the same time the tip is kept in position on the metal. Frequently, this may require more than one person, but in any event this is a difficult task for a single individual to easily accomplish. The direct self welding of an impact tool to a metal surface is not shown or suggested.

Other prior art apparatuses which are known teach the welding, brazing, soldering, or threading of a metal stud, washer, or the like to the metal surface to be straightened so that this affixed element can be grasped or otherwise captured by a slide hammer or the like to impart a pulling force or a pushing force on the metal to be straightened. As in Hall, this requires a two-step process which is awkward and at best time consuming. U.S. Pat. No. 3,791,012 issued to Jenkin on Feb. 12, 1974 teaches an impact device which clamps onto a threaded stud threadably engaged in an aperture disposed in a work piece.

U.S. Pat. No. 3,801,772 issued to Curcio et al on Apr. 2, 1974 teaches a tool for repairing an indented surface of a sheet metal panel wherein the tool includes a stud welder for welding a stud to a metal panel and a gripping apparatus for pulling on the stud once it is welded into position. As in other stud welding and pulling apparatuses, everytime the device is used, the stud must be engaged by the tool, the tool must be used to weld the stud in position, the stud must be clamped in the tool, and then the pulling force must be exerted on the stud. Although in some respects effective, it shall become apparent that the present invention accomplishes this in a single operation.

Other apparatuses such as those shown in U.S. Pat. Nos. 3,825,717 issued to Hughes, Jr. on July 23, 1974; and 4,103,140 issued to Glatthorn on July 25, 1978 impact a stud to effect contact with a metal surface or to position the stud as desired and then subsequently weld the stud to a surface. Although these devices perform functions which are individually similar to the present invention and other prior art devices, these functions are not aggregated in the same serial relationship as the present invention and therefore perform in a quite different manner for quite different purposes. In addition, these apparatuses do not teach the direct self welding of an impact tool to a work piece.

U.S. Pat. No. 3,959,619 issued to Schill on May 25, 1976 shows as apparatus for straightening bent metal surfaces wherein an electrode is brought into contact with the metal surface to be straightened in a series of hammer blow-like movements which heat up the metal to a high temperature. This heating allegedly causes the metal to return to its original undented shape. The electrode is never welded to the metal surface, but is merely used to melt small openings in the surface to relieve the stresses therein. As in other devices previously discussed, after the panel is returned to its proper shape, it is perforated with numerous openings all of which must be repaired. Additionally, it is well known in the art that if sheet metal is bent severely enough, it stretches and no amount of heating can put it back into the proper shape since the metal has been stretched in the bending process.

The present invention overcomes all of the mechanical as well as time element shortcomings of the prior art by providing a tool for recontouring metal which is used in conjunction with an electrical welding apparatus. A portion of the tool is welded directly to the surface to be straightened and, through the use of slidable means which creates both compression and tension forces as desired, it can be easily and quickly employed to reposition the metal surface as desired. After repositioning of the metal surface, the tool is merely twisted to release the previously created weld so that the tool can be employed elsewhere as desired.

SUMMARY OF THE INVENTION

Therefore, a primary object of the present invention is to provide a tool for recontouring a metal surface which is used in conjunction with an electrical welding apparatus wherein the tool is welded directly to the surface of the metal which is to be recontoured.

A further object of the present invention is to provide a tool for recontouring metal which is used in conjunction with an electrical welding apparatus wherein the tool can easily and quickly be removed from the surface of the metal to which it is directly welded.

A still further object of the present invention is to provide a tool for recontouring metal which is affixed by the direct welding thereof to a surface of metal in such a manner that the tool can be repeatedly used without interruption for replenishment or affixation of supplies.

Still another further object of the present invention is to provide a tool for recontouring metal surfaces which is welded directly to the metal to be recontoured through employment of presently available conventional electrical welding apparatuses.

Another still further object of the present invention is to provide a tool for recontouring metal surfaces which can accomplish this task quickly and easily without necessity for a burdensome number of separate operations.

Another further object of the present invention is to provide a tool for recontouring metal which is ideally suited for use in auto body reconstruction and repair.

Still another further object of the present invention is to provide a tool for recontouring metal which does not require penetration of the metal, a practice which is impossible or impractical with delicate materials.

A still additional object of the present invention is to provide a tool for recontouring metal which is simple in design, relatively inexpensive to manufacture, rugged in construction, easy to use, and efficient in operation.

These objects, as well as further objects and advantages of the present invention, will become readily apparent after reading the ensuing description of the non-limiting illustrative embodiments and viewing the accompanying drawing.

A tool for recontouring metal for use in conjunction with an electrical welding apparatus according to the principles of the present invention includes shaft means for contacting the metal; means for imparting forces to the shaft means which are transferred thereby to the metal when the shaft is in contact therewith; and means for electrically connecting the portion of the shaft means which contacts the metal to the electrical welding apparatus so as to permit use of the shaft means as an electrode of the welding apparatus, activation of the welding apparatus welding the shaft means to the metal. Subsequent to the imparting of forces to the metal surface, the weld is broken by a twisting action of the shaft means and the tool can be immediately reemployed as desired.

BRIEF DESCRIPTION OF THE DRAWING

In order that the present invention may be more fully understood, it will now be described, by way of example, with reference to the accompanying drawings in which.

DESCRIPTION OF THE PREFERRED EMBODIMENTS

Figure 1:
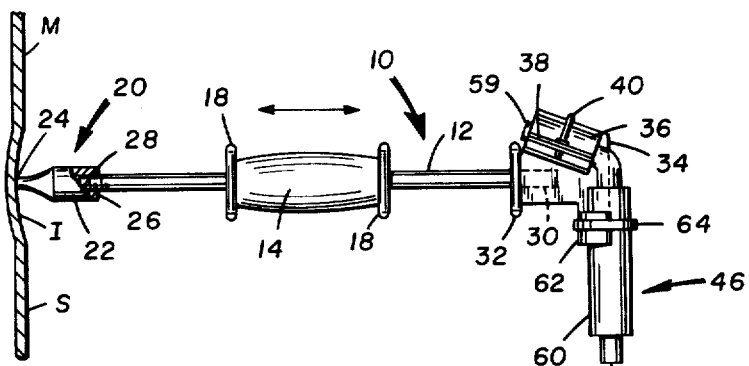
FIG. 1 is a pictorial representation of the present invention in use in conjunction with an electrical welding apparatus.
Figure 1:
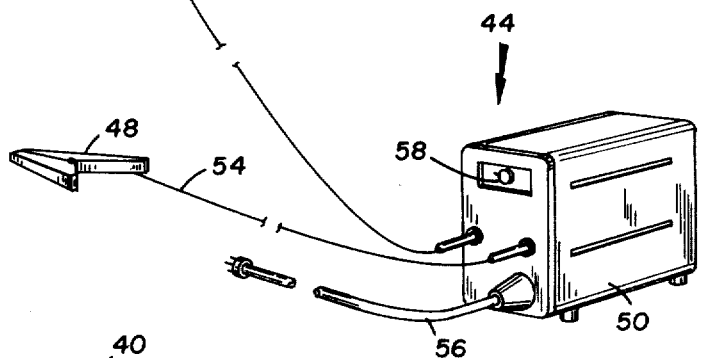
Figure 2:
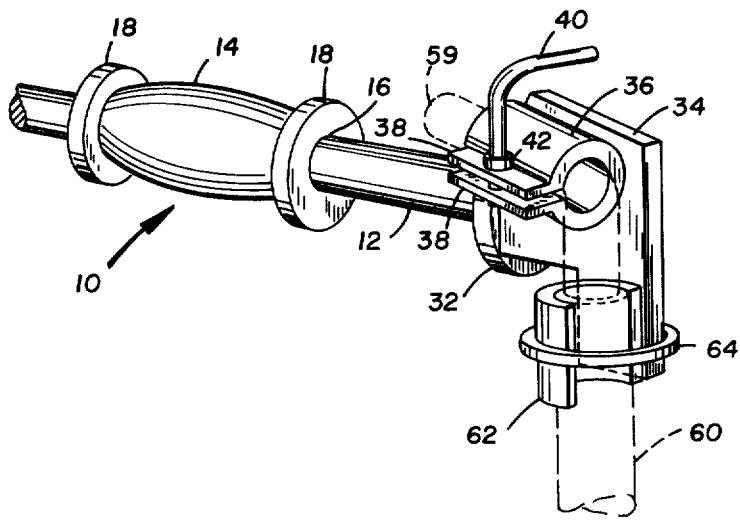
FIG. 2 is a fragmentary pictorial representation of the embodiment of the present invention illustrated in FIG. 1.

Referring now to the figures, and more particularly to FIGS. 1 and 2 thereof, there is illustrated therein a tool 10 which is used for recontouring metal or the like. The tool 10 includes a rod 12. A weight 14 is slidably disposed on the rod 12 with the rod 12 extending through a longitudinal chamber 16 disposed through the weight 14. The weight 14 is contoured to facilitate the gripping thereof by a human hand and is provided with end ridges 18 to inter alia protect the hand of the user. Although the weight 14 is shown in a particular configuration, it may be differently contoured and may be shaped differently as is well known in the art. An end 20 of the rod 12 is provided with a removable tip 22. The removable tip 22 is preferably tapered as illustrated and terminates in a substantially flat portion 24. The tip 22 has a plurality of internal threads 26 which threadably cooperate with a plurality of external threads 28 disposed on the outer surface of the rod 12. Since the tip 22 is removable, it can be replaced when worn or exchanged with a differently configured tip as desired by the user. In addition, the tip 22 could be affixed employing other suitable means or might be integral with the rod 12, the entire rod 12 being replacable as necessary. Disposed adjacent to the end 30 of the rod 12 is a stop 32 fixedly secured to the rod 12. As the weight 14 is reciprocated on the rod 12 by the user, it can be collided with the stop 32 or the tip 22 to impart forces to the rod 12 for purposes hereinafter described. If the tip 22 assumes a different configuration, a stop can be secured to the rod 12 adjacent thereto if necessary for collision with the weight 14.

A plate 34 is fixedly secured to the rod 12 by welding or integral formation and provides a clamp 36 mounted thereon. The clamp 36 is formed as a slit tube having a pair of radially extensive lips 38 adjacent to the slit. The lips 38 can be forced adjacent to each other by a bolt 40. The bolt 40 threadably engages a threaded aperture in one of the lips 38 and is precluded from slipping through an aperture disposed in the other lip 38 by a stop 42 fixedly secured to the lip 38. As a result, rotation of the bolt 40 draws one of the lips 38 toward the other threaded lip 38 thereby diminishing the diameter of the clamp 36 and clamping whatever is inserted therein.

The present invention is used in conjunction with an electric welding apparatus of which welding apparatus 44 is a representation. Welding apparatus 44 includes an electrode 46 and a grounding clamp 48. The electrode 46 and grounding clamp 48 are connected, respectively, to a conventional power unit 50 of the welding apparatus 44 by a pair of electrical cables 52 and 54. The conventional power unit 50 is well known in the art and operates when the line cord 56 is plugged into a conventional electrical outlet. In addition, the power unit 50 is provided with an on-off switch 58. When in conventional use, the welding apparatus 44 is employed by clamping of the grounding clamp 48 to the metal surface to be welded. The unit is energized, and the end 59 of the electrode 46 is brought in contact with the metal to be welded thereby effecting a weld.

In the present invention however, the rod 12 including the tip 22 thereof which are constructed of metal, serves as an electrode. The electrode end 46 is received in the clamp 36 and is secured therein by rotation of the bolt 40 as previously described. The handle 60 of the electrode 46 is engaged by a cradle element 62 to mount the electrode 46 on the plate 34. In addition, a band, strap, or the like 64 is provided to further secure the handle 60 in the cradle element 62. This band 64 can be variously configured such as an elastic band, an adjustable metal clamp, etcetera.

The clamp 36 is in electrical contact with the plate 34 which in turn is in electrical contact with the rod 12. As a result, when the electrode 46 is energized, the rod 12 at the tip 22 becomes an electrode. It should be apparent to one of ordinary skill in the art that the plate 34, clamp 36, and cradle 62 merely serve the purpose of mounting the electrode 46 to the rod 12 and electrically connecting the same thereto. If a welding apparatus 44 and it provided a differently configured electrode, the aforementioned elements could be modified or substituted for with suitable structure to accomplish the function of mounting the electrode of an alternate welding apparatus. These elements may also be modified to mount the electrode 46 in a different manner as desired. For instance, the clamp might be fixed directly to the rod, an alternate clamp might be employed, a differently configured plate might be employed, a housing might be used to cover this assembly, or the housing might be used to directly clamp to the electrode, all of these variations being within the scope of the present invention.

The present invention is employed for straightening bent metal such as the indentation I disposed in sheet metal M of FIG. 1. If this indentation is to be straightened by pulling of indentation I toward tool 10 so that the outer surface S of metal M is once again planar, the tool 10 will be employed as follows: the flat portion 24 of the tip 22 would be placed against the surface S of metal M after surface S is cleaned so that it is electrically conductive. Grounding clamp 48 would then be affixed to metal M so that it is in electrical contact therewith. The welding apparatus 44 would be energized causing the tip 22 of the rod 12 to be directly spot welded to metal M. Once this is accomplished, the weight 14 would be drawn back toward the stop 32 in sharp rapid blows so that the weight 14 collides with the stop 42 imparting a tensioning force to the rod 12. This tensioning force would pull the indentation I of the metal M toward the tool and this process would be repeated until the indentation I no longer existed or metal the surface S of the metal M was once again contoured properly.

If a protrusion is to be pressed down rather than an indentation pulled out, the tool 10 could be employed by welding of the tip 22 as previously described to the protrusion and urging of the weight 14 against the tip 22 so that the collision therebetween would cause a compression force forcing the tip away from the user and therefore depressing the protrusion. After adjustment of the metal surface which is being worked upon is accomplished, the user merely twists the tool 12 to break the spot weld effected between the tip 22 and the metal M so that the tool can be moved to the next location to perform the same operation.

It can be seen that through employment of the present invention, the task of straightening metal is greatly facilitated. By manipulation of a single tool and no additional elements such as studs or the like, the tool is welded to the metal to be straightened and then the same tool is manipulated by the user to impart the necessary force to the metal to be acted upon. While the weight 14 is shown as manually manipulated along the rod 12, it might well be driven by spring, pneumatic, magnetic, or other means as desired. Although the rod 12 has been illustrated and described as being metal and circular, other configurations serving as a shaft can be employed such as those having different geometric cross sections, etcetera. Alternately, the rod could be constructed of other than metal and the electric contact between the electrode 46 of the welding apparatus 44 and the tool 10 could be directly at a metal portion of the rod. For instance, a fiber glass rod having a metal tip could be employed wherein the electrode of the welding apparatus is electrically connected directly to the tip.

Figure 3:
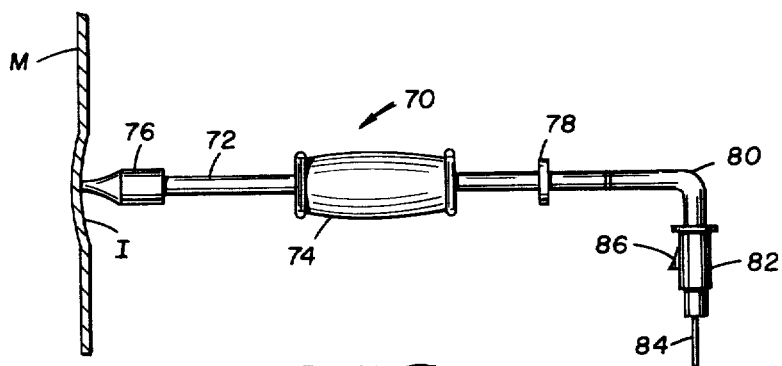
FIG. 3 is a side view of an alternate embodiment of the present invention.

The embodiment of FIGS. 1 and 2 is shown for use in conjunction with already existing welding apparatuses which, for the most part, have electrodes already wired thereto. FIG. 3 illustrates a tool 70 which incorporates the features of the present invention therein and is for use in conjunction with welding apparatuses which have interchangeable electrode cables or for incorporation in newly manufactured welding apparatuses which are to be used solely with the present invention.

The tool 70, illustrated in FIG. 3, includes a rod 72, a weight 74, a tip 76, and a stop 78 which function as the corresponding elements 12, 14, 22, and 32 of FIGS. 1 and 2. Tool 70 incorporates a handle 80 having a grip portion 82. An electrical cable 84 passes through the handle 82 and is electrically connected to the rod 72 of the tool 70, the rod 72 being metal. In series with the cable 84 is a trigger switch 86 operably mounted on the handle portion 82. The free end of the cable 84, as illustrated in FIG. 3, is connected directly to the power unit of the welding apparatus which would be left in an energized condition. The user would then merely have to pull the trigger 87 to effect welding of the tip 76 to a metal surface as represented by metal surface M. The weight 74 can then be manipulated along the rod 72 to transfer tension or compression forces to the indentation I of the metal M as desired. While the handle 80 and the hand grip portion 82 thereof are shown in a particular configuration, it should be apparent to those skilled in the art that other suitable configurations might also be employed.

It will be understood that various changes in the details, materials, and arrangements of the parts and operational conditions which have been herein described and illustrated in order to explain the nature of the invention, may be made by those skilled in the art within the principles and scope of the present invention.

Having thus set forth the nature of the invention, what is claimed is:

1. A tool for recontouring metal used in conjunction with an electrical welding apparatus comprising:
shaft means for contacting said metal, said shaft means comprising a rod including tip means, said shaft means contacting said metal through said tip means;
means for imparting forces to said shaft means which are transferred thereby to said metal when said shaft is in contact therewith, said force imparting means imparting force directly to said shaft means, said force imparting means comprising a weight having an opening disposed therethrough, said weight being slidably disposed on said rod with said rod passing through said opening, stop means being disposed on said rod adjacent to the end thereof opposite said tip means, sliding of said weight along said rod toward said stop means and the collision of said weight with said stop means imparting a tension force on said rod when said rod is fixedly secured to said metal; and means for electrically connecting the portion of said shaft means which contacts said metal to said electrical welding apparatus, said shaft means when so connected being the electrode of said welding apparatus, activation of said welding apparatus welding said shaft means directly to said metal;

said shaft means being removable from said metal as an integral portion of said tool subsequent to said electrical connection of said shaft to said metal.

2. A tool in accordance with claim 1, wherein said tip means is removable and replacable.

3. A tool in accordance with claim 2, wherein said tip means comprises a tapered element which threadably engages said shaft means.

4. A tool in accordance with claim 1, wherein sliding of said weight along said rod toward said tip means and the subsequent collision of said weight with said tip means imparts a compression force in said rod when said rod is in contact with said metal surface.

5. A tool in accordance with claim 1, wherein said weight is contoured to facilitate the grasping thereof by a human hand.

6. A tool in accordance with claim 1, wherein said electrical connection means comprises a clamp fixedly secured to said shaft means, said clamp for selectively securing therein one of the electrode supply cables of said welding apparatus, said clamp being in electrical contact with said portion of said shaft means contacting said metal surface.

7. A tool in accordance with claim 6, wherein said shaft means comprises a metal rod, said tip means comprising an electrically conductive meterial and being electrically connected to said metal rod on one end thereof, said clamp being in electrical connection with said metal rod and being disposed adjacent to the other end thereof.

8. A tool in accordance with claim 7, wherein said electrode supply cable of said welding apparatus terminates in an electrical probe, said clamp being for selectively securing therein said electrical probe, and means for removably mounting said electrical probe on said metal rod.

9. A tool in accordance with claim 8, wherein said mounting means comprises an electrically conductive plate fixedly secured to said metal rod, said clamp being fixedly secured to said plate, and a cradle element fixedly secured to said plate, said clamp and said cradle element removably mounting said electrical probe.

10. A tool in accordance with claim 9, further comprising means for removably securing said electrical probe to said cradle element.

11. A tool in accordance with claim 1, wherein said electrical connection means comprises an insulated handle fixedly secured to said rod adjacent to said stop means, and an electrical conductor which passes through said insulated handle, said rod being metal, one end of said electrical conductor being fixedly secured to said metal rod, the other end of said electrical conductor being adapted to be electrically connected to said welding apparatus, said rod serving as an electrode of said welding apparatus.

12. A tool in accordance with claim 11, further comprising a switch disposed in said handle and being operably connected in series with said electrical conductor.

* * * * *